United States Patent [19]
Wulkan

[11] Patent Number: 5,991,384
[45] Date of Patent: Nov. 23, 1999

[54] APPARATUS FOR FACILITATING THE MAKING OF A CALLING CARD TELEPHONE CALL

[75] Inventor: Itzhak Wulkan, Ra'Anana, Israel

[73] Assignee: CallManage, Ltd., Kfar Sava, Israel

[21] Appl. No.: 08/929,488

[22] Filed: Sep. 15, 1997

[51] Int. Cl.[6] .......................... H04M 17/00; H04M 15/00
[52] U.S. Cl. ........................................ 379/144; 379/114
[58] Field of Search .................................. 379/114, 144, 379/406, 127, 115, 112, 113; 455/403, 405, 406, 407, 408, 409

[56] References Cited

U.S. PATENT DOCUMENTS

| | | |
|---|---|---|
| 5,343,519 | 8/1994 | Feldman . |
| 5,450,479 | 9/1995 | Alesio et al. . |
| 5,452,352 | 9/1995 | Talton . |
| 5,455,857 | 10/1995 | McGuire . |
| 5,497,411 | 3/1996 | Pellerin . |
| 5,509,056 | 4/1996 | Ericsson et al. ......................... 379/144 |
| 5,675,607 | 10/1997 | Alesio et al. ........................... 379/144 |
| 5,774,533 | 6/1998 | Patel ....................................... 379/144 |
| 5,825,863 | 10/1998 | Walker .................................... 379/144 |
| 5,844,972 | 12/1998 | Jagadish et al. ........................ 379/144 |
| 5,845,205 | 12/1998 | Alanara et al. .......................... 379/144 |

*Primary Examiner*—Curtis A. Kuntz
*Assistant Examiner*—Rexford N Barnie
*Attorney, Agent, or Firm*—Ohlandt, Greeley, Ruggiero & Perle L.L.P.

[57] ABSTRACT

An apparatus for facilitating the making of a calling card telephone call includes a central processing unit (CPU) and a storage device for storing access data to enable access to a central telephone office connected to a telephone network, account data and a telephone number. The apparatus further includes a dialer capable of transmitting and receiving signals to and from the user interface, the telephone network and the central telephone office. The central processing unit, responsive to an entry of the telephone number on the user interface, stores the telephone number in the storage device. Thereafter, the CPU causes the dialer to transmit access data from the storage device, across the telephone network, to initiate communication with the central telephone office. Finally, the CPU, responsive to requests for information from the central telephone office, causes the dialer to transmit the telephone number and the account data in the order requested by the central telephone office, to complete the calling card transaction.

28 Claims, 11 Drawing Sheets

/‒ 56

| CALLING CARD DATABASE | | | |
|---|---|---|---|
| CALLING CARD TYPE | ACCESS NUMBER | CALLING CARD NUMBER (INCLUDING PIN) | TRANSACTION PROTOCOL |
| BELL ATLANTIC IQ CARD | 0 | XXXXXXXXXX-XXXX | FIRST PROTOCOL |
| SNET CARD | 18005555321 | ZZZZZZZZZZ-ZZZZ | SECOND PROTOCOL |
| [...] | [...] | [...] | [...] |

| FIRST PROTOCOL | |
|---|---|
| CENTRAL OFFICE REQUEST | CALLER RESPONSE |
| FIRST REQUEST | TRANSMIT TELEPHONE NUMBER |
| SECOND REQUEST | TRANSMIT CALLING CARD NUMBER |

| SECOND PROTOCOL | |
|---|---|
| CENTRAL OFFICE REQUEST | CALLER RESPONSE |
| FIRST REQUEST | TRANSMIT TELEPHONE NUMBER |
| SECOND REQUEST | TRANSMIT CALLING CARD NUMBER |

FIG. 12

APPARATUS FOR FACILITATING THE MAKING OF A CALLING CARD TELEPHONE CALL

FIELD OF THE INVENTION

The present invention relates to making of a calling card telephone call and, more particularly, to an apparatus for minimizing caller input actions during the making of a calling card telephone call.

BACKGROUND OF THE INVENTION

Calling cards are frequently employed in the making of a telephone call. The term "calling card" hereinafter refers to any type of credit account mechanism including, but not limited to a telephone-company-issued card, such as the Bell Atlantic IQ Card and the SNET card, and a combined commercial credit card and telephone card, such as the AT&T Universal Card.

Conventional approaches to implement a calling card telephone call requires numerous, cumbersome, time consuming steps or actions to be taken by a caller. In a typical scenario, a caller who places a calling card telephone call must lift a telephone handset to obtain a dial tone and then manually enter access data on the telephone keypad to initiate communication with a central office which controls the calling card transaction. Upon a connection, the central office prompts the caller for additional information such as the card number, the personal identification number (PIN), if any, and the telephone number of the party to be reached. The caller, thus, must manually enter all of the above-noted information for each call in the transactional sequence prescribed by the central office. The transactional sequence for delivering the above information may vary according to the particular calling card being used and the particular central office which controls the transaction.

The process of placing a calling card telephone call may further be encumbered by requiring the caller to dial special codes (i.e., the number "9") to obtain access to a local exchange and, if necessary, an interexchange access code to connect the caller to his interexchange carrier of choice. Such additional codes are often necessary when calling from a hotel or hospital.

One approach to remedy the above problem is to install phones having magnetic readers such as those found in some airports and high credit card use areas. These special phones allow a caller to charge a call to a credit card. Because so few of these phones exist, a credit card caller must often either wait in line for this special phone or is forced to manually enter the credit card number by way of the keypad on a standard phone set. The magnetic card reader phone is impractical for hotel rooms and many other general locations. Furthermore, these special phones are only applicable to credit card charged calls and not for calling cards which, as described above, require interaction with a central office.

Another approach to solving the above problems is provided in U.S. Pat. No. 5,455,857 to McGuire which discloses an automatic telephone calling card. The calling card includes a microprocessor or logic circuit, keypad, storage device, tone generator, speaker and display. Telephone numbers and calling card numbers can be stored in the storage device through the use of the keypad on the card. In order to make a calling card call, the cardholder lifts the handset of a telephone to obtain a dial tone. The cardholder then selects access data to initiate communication with a central office (i.e., 1-800 number), places the card at the mouthpiece of the telephone handset and causes the card to generate a plurality of audio tones representative of the access data. The cardholder then responds to a signal from the central office by placing the card at the mouthpiece of the handset and a plurality of audio tones are generated representative of the card number. The cardholder continues this process until all information required by the central office is provided. Although the cardholder no longer needs to memorize or manually input the telephone numbers and the card number, the use of the card still requires numerous, cumbersome, time consuming steps to make a calling card telephone call.

U.S. Pat. No. 5,452,352 to Talton also discloses an automatic dialing card for use in automatically dialing account codes and phone numbers into a telephone. The card includes a memory, encoder, speaker, microphone and switch embedded into a circuit board, for inputting and outputting specific information depending on the use of the card. The circuit accesses the account by tones or signals fed through the receiver or direct data input from a small data bus. As with U.S. Pat. No. 5,455,857, the Talton card requires the card holder to place the card at the telephone receiver for each call.

In addition to the problems with automatic dialing cards as described above, both U.S. Pat. Nos. 5,455,857 and 5,452,353 are limited in their applications, particularly to the making of person-to-person calls. Automatic dialing cards cannot be used in connection with other devices such as an internet-ready device (i.e., computer with browser software) or a fax machine.

U.S. Pat. No. 5,497,411 to Pellerin discloses an access-control system for a telecommunication network. The system includes a portable memory device card for storing a resident personal identification number (PIN) of a user and a corresponding transaction profile including authorization codes. The card is used in combination with an access-control module (i.e., a terminal) coupled to the network. Such a system is overly complex and requires the use of both the card and the control module to make a calling card call.

In view of the foregoing, there is a need to provide an apparatus for simplifying the operations required of the caller to make a calling card telephone call. There is also a need to provide an apparatus that allows a user to simply enter the telephone number in the making of a calling card telephone call.

Accordingly, it is an object of the present invention to provide an apparatus which simplifies the task of a card holder when making a calling card telephone call.

Another object of the invention is to provide an apparatus which requires minimal input by the card holder when making a calling card telephone call.

It is a further object of the invention to provide an apparatus in which the user is only required to enter desired telephone number to make a calling card telephone call.

It is also an object of the invention to provide an apparatus which, in addition to the above, selects the best calling card from a plurality of calling cards.

SUMMARY OF THE INVENTION

An apparatus for facilitating the making of a calling card telephone call includes a central processing unit (CPU) and a storage device for storing access data to enable access to a central telephone office connected to a telephone network, account data and a telephone number. The apparatus further includes a dialer capable of transmitting and receiving signals to and from the user interface, the telephone network and the central telephone office. The central processing unit, responsive to an entry of the telephone number on the user interface, stores the telephone number in the storage device. Thereafter, the CPU causes the dialer to transmit access data from the storage device, across the telephone network, to initiate communication with the central telephone office. Finally, the CPU, responsive to requests for information from the central telephone office, causes the dialer to transmit the telephone number and the account data in the order requested by the central telephone office, to complete the calling card transaction.

BRIEF DESCRIPTION OF THE DRAWINGS

FIG. 10 is a schematic diagram of a calling card database maintained in the apparatus of FIG. 2.

FIG. 11 is a schematic diagram of a first protocol database maintained in the apparatus of FIG. 2.

FIG. 12 is a schematic diagram of a second protocol database maintained in the apparatus of FIG. 2.

DETAILED DESCRIPTION OF THE INVENTION

Before proceeding with a detailed description of the invention, it is well to define certain terms to be used herein. Account data refers to a "card number" which is a multi-character string that identifies the account associated with the card such as a telephone number subscribed by the caller (i.e., home telephone number). Account data may also include a personal password such as a personal identification number (PIN) for security purposes.

A "calling card telephone call" refers to a telephone call whose cost is charged to the account associated with the calling card.

It should be noted that a telephone handset, as used herein, refers to both a typical telephone handset that is connected directly to a telephone network (PSTN) or connected to the PSTN, via a Private Branch Exchange (PBX) or a Central Branch Exchange (Centrex) such as in hotels and offices. The telephone handset preferably includes a user or caller interface, such as a keypad, and a receiver for person-to-person communication.

Figure 1:
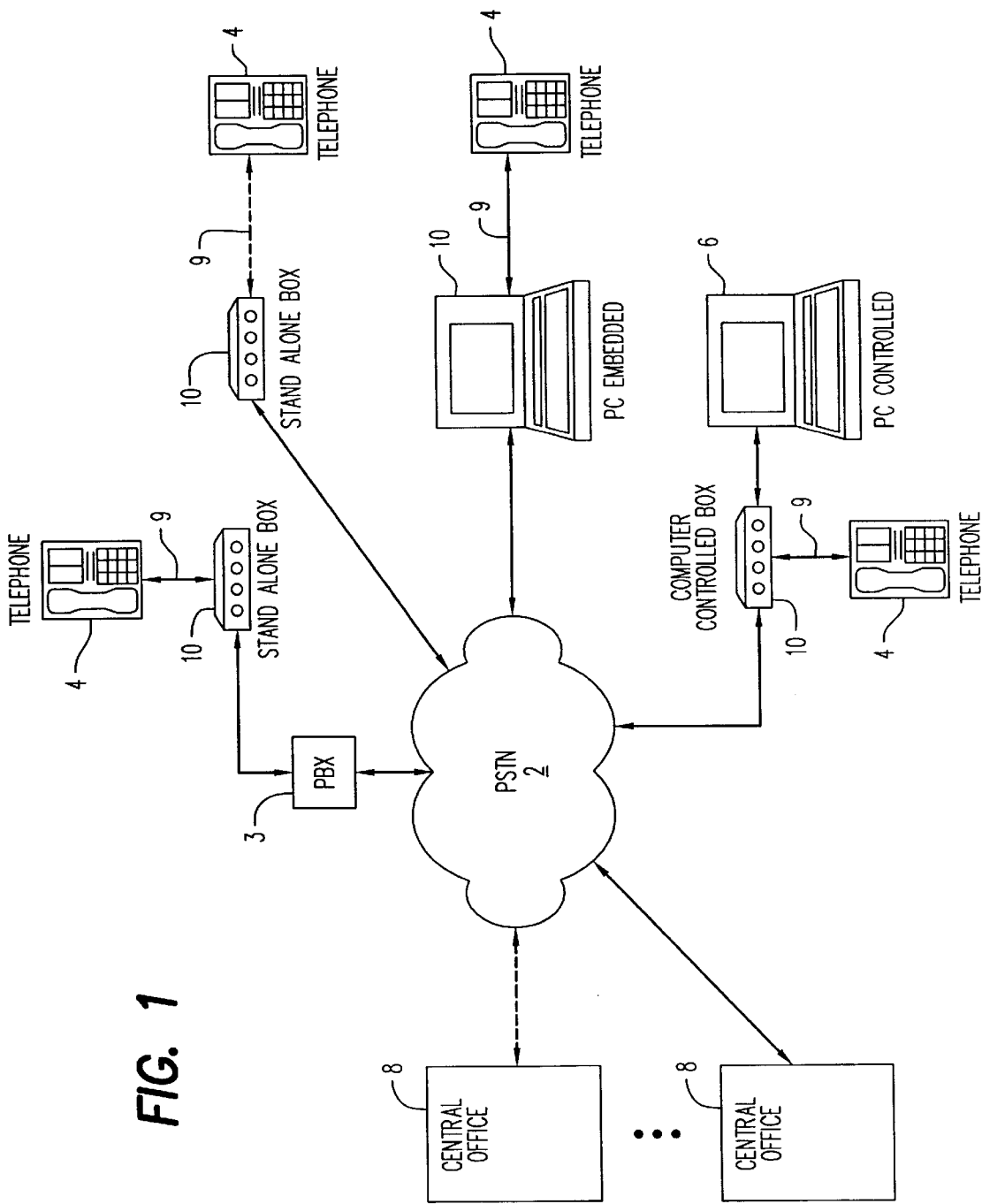
FIG. 1 illustrates an apparatus, connected to a telephone network (PSTN) in various configurations, for facilitating the making of a calling card telephone call, in accordance with the present invention.

Turning to the present invention as shown in FIG. 1, there is provided an apparatus 10 for facilitating the making of a calling card telephone call. Apparatus 10 is connected between a telephone handset 4 (via a telephone line 9) and a telephone network (PSTN). Also, connected across PSTN 2 are a plurality of receiving parties including central offices 8. Each central office 8 controls a calling card transaction for a particular category of calling cards and has associated therewith access data (i.e., telephone network identifier). Apparatus 10 can thus transmit or receive information to and from telephone handset 4 and receiving parties.

In the general operation of the present invention, a caller enters a telephone number on telephone handset 4 such as when dialing an ordinary telephone call (i.e., a non-calling card call). Apparatus 10 monitors telephone line 9 to detect a telephone number entered on telephone handset 4 and stores the entered telephone number. Apparatus 10 thereafter transmits access data to initiate communication with a central office 8, associated with the particular card being used, so as to initiate a calling card transaction. Upon connection with central office 8, apparatus 10 receives and automatically responds to all information requests by central office 8, such as the card number to which the telephone call is being charged, telephone number, etc., in order to complete the calling card transaction. In this way, apparatus 10 automatically performs all operations necessary to make a calling card telephone call and only requires the caller to enter or dial the desired telephone number of the receiving party, as if the caller is making an ordinary telephone call.

As shown in FIG. 1, apparatus 10 may be configured as a stand alone box, integrated or embedded into a personal computer (preferably a laptop or portable computer) or combined with a personal computer that controls the operation of apparatus 10. In addition, apparatus 10 may either be directly connected to the PSTN or indirectly connected to the PSTN, via a PBX or Centrex. As can be appreciated by those skilled in the art, apparatus 10 allows a caller to simply enter a desired telephone number on telephone handset 4 to make a person-to-person call, a telefax call, or internet connection call to a Internet Service Provider (ISP), all to be charged to the calling card account.

Figure 2:
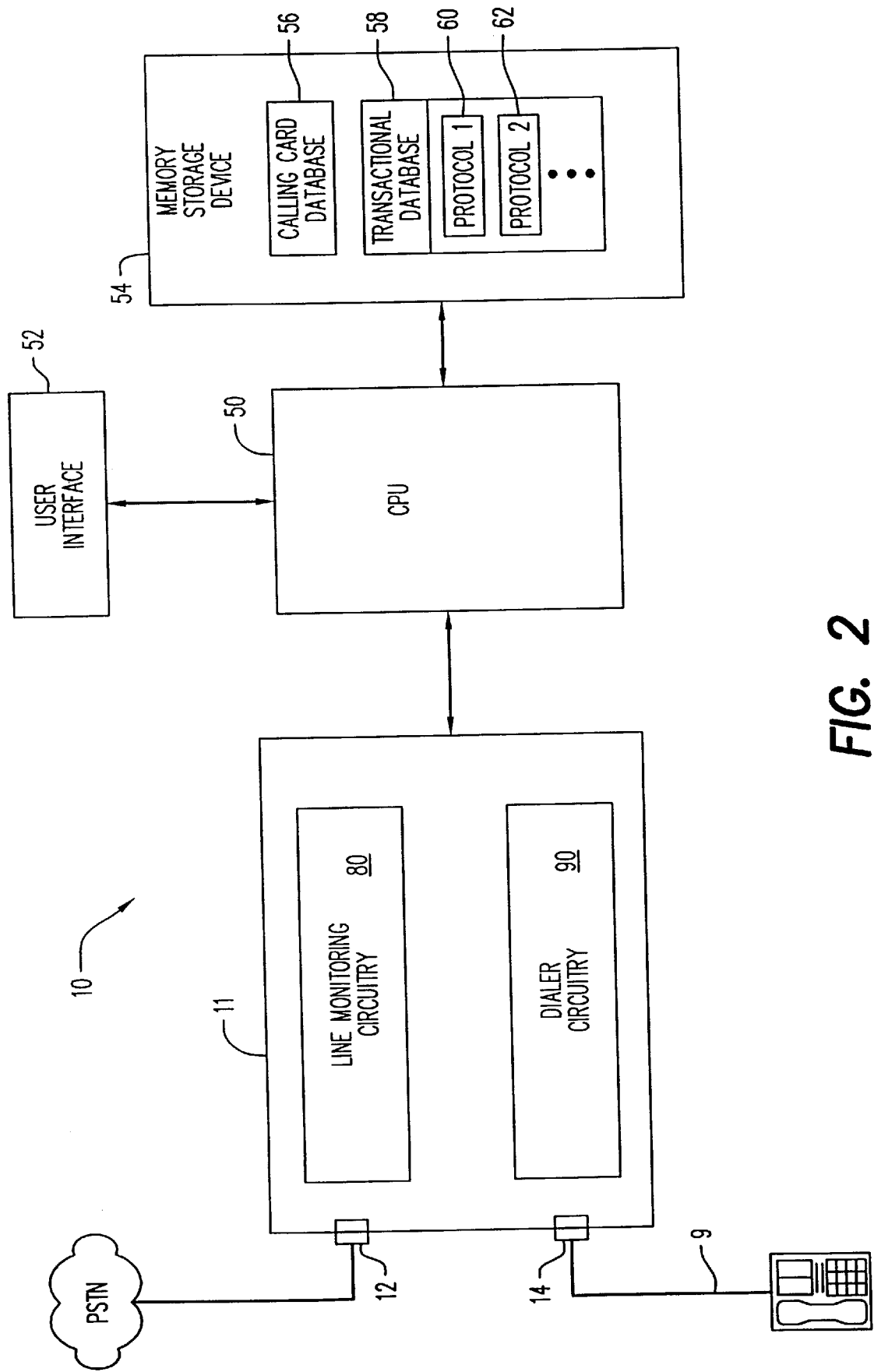
FIG. 2 illustrates a block diagram of the components of the apparatus of FIG. 1.

FIG. 2 illustrates a block diagram of a representative apparatus 10. Apparatus 10 includes a central processing unit (CPU) 50, coupled to a user interface 52, for controlling the components of apparatus 10. Apparatus 10 also includes a dialer 11 connected to PSTN and telephone handset 4 (which itself may serve as a user interface), across telephone line 9, via respective communication ports 12, 14. Dialer 11 includes line monitoring circuitry 80 for monitoring and detecting information or data transmitted across telephone line 9 (i.e., a telephone number entered on handset 4 and information requests by central office 8) and dialer circuitry 90 for transmitting information to handset 4 or PSTN 2. A memory storage device 54 stores a calling card database 56 and transactional database 58 which includes a first protocol database 60, a second protocol database and so forth depending on the number of calling cards stored in calling card database 56.

A schematic illustration of the contents of calling card database 56 is found in FIG. 10 and Datatypes therein preferably include Calling Card Type; Access data; Calling Card Number (including a PIN number if appropriate) and Transaction Protocol. Most of the contents of calling card database 56 are self explanatory and require no further description. The Calling Card Type identifies the particular type of calling card, such as a Bell Atlantic IQ Card, SNET card and so forth. The Access data is the telephone number necessary to initiate communication with a particular central office which controls the calling card transaction. For instance, a caller can initiate communication with a central office with the SNET Card by transmitting the following access data: 1-800-5555321.

The Calling Card Number identifies the account to which a call is to be charged and may include a personal identification number (PIN). The transaction protocol identifies a particular protocol or subroutine stored in transaction protocol database 58 to be used in the calling card transaction the central office. For instance, the transactional protocol or sequence of a calling card transaction with the SNET card is stored in First Protocol 60. Accordingly, calling card database 56 provides sufficient information to enable apparatus 10 to perform the invention without requiring any further data from the caller, except the telephone number of the receiving party.

First Protocol database 60 is schematically shown in FIG. 11 and includes a Central Office (CO) Request and a Caller Response. The CO Request identifies the sequential order of the request, i.e., a first request, second request and so forth. The Caller Response relates to the appropriate response to be made, based on the particular request. For instance, apparatus 10 will transmit the calling card number for a second request by the central office. Database 60, thus, has stored therein the transactional protocol or sequence of a central office, in this case, for the Bell Atlantic IQ Card. In this way, apparatus 10 can perform the necessary calling card transaction, i.e., respond to the requests by central office and complete a calling card transaction.

Second Protocol 62 is schematically shown in FIG. 12 and, as with first protocol 60, includes Central Office Request (CO) and Caller Response. Second Protocol 62 has stored therein the transactional protocol or sequence of a central office, in this case, for the SNET card.

While only first and second protocols 60, 62 are described, apparatus 10 may include any number of protocols, depending on the number of calling cards stored in calling card database 56. Additional calling card protocols and calling card information, such as Calling Card Type, Calling Card Number and Transactional Protocol may be stored in respective transactional and calling card databases 58, 56, via user interface 52 for a stand alone apparatus 10 and via computer interface (i.e., keyboard) for a computer integrated or controller apparatus 10 (FIGS. 1 and 2.).

As shown in FIG. 2, CPU 50 controls the various hardware and software components of apparatus 10 to perform a calling card transaction for a caller seeking to make a calling card telephone call. CPU 50 has been configured to perform the following functions: detecting and storing a telephone number entered on telephone handset 4 by the caller (via line monitoring circuitry 80); transmitting access data across the PSTN to initiate communication with a receiving party such as central office 8 in charge of the particular calling card transaction (via dialer circuitry 90); monitoring and detecting information requests from central office 8 (via line monitoring circuitry 80); and transmitting appropriate responses according to protocols stored in memory storage device 54, such as the entered telephone number, the calling card number (with or without the PIN) and so forth for each information request by central office 8, in order to complete a calling card transaction.

Figure 3:
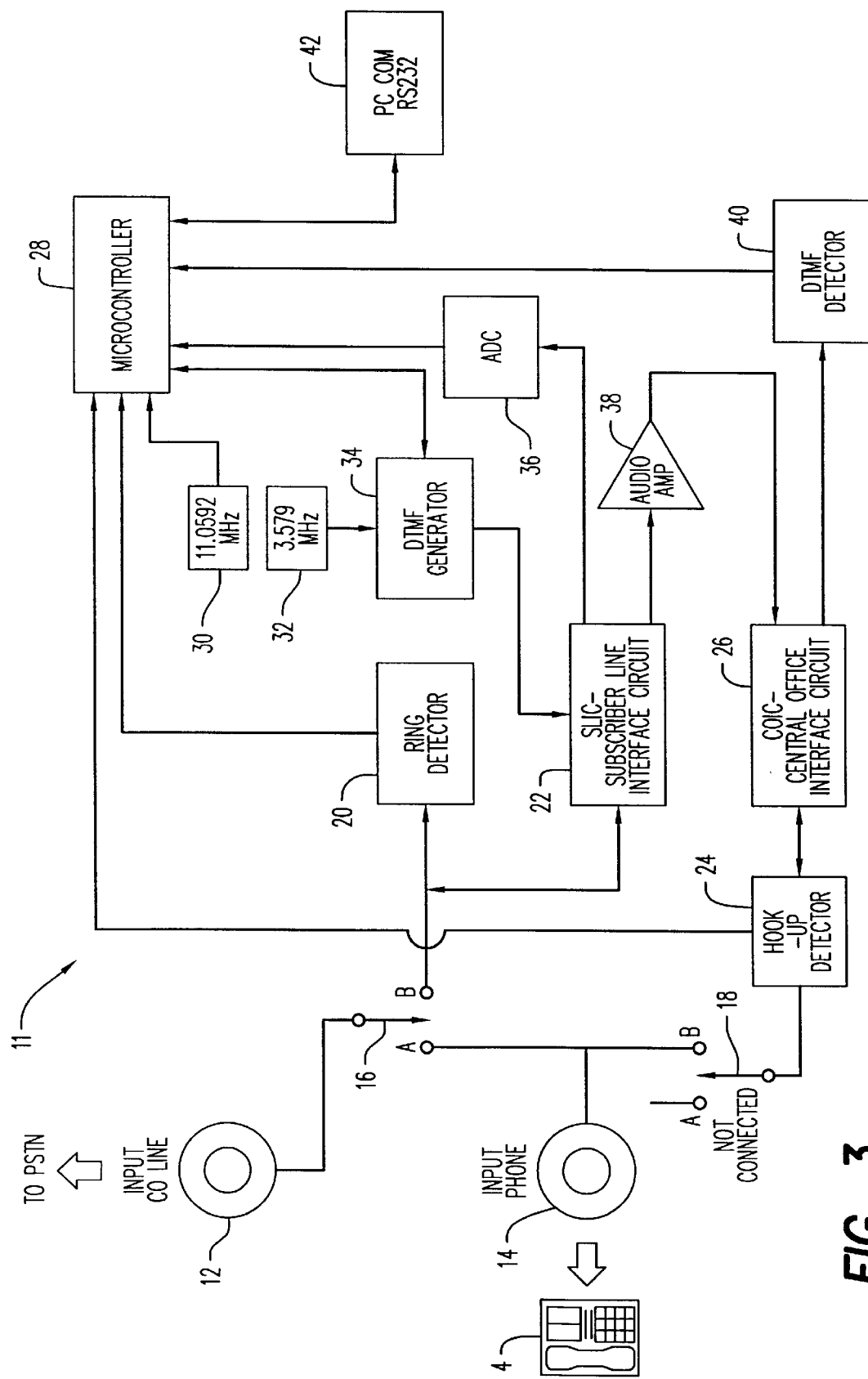
FIG. 3 illustrates a block diagram of the components of a dialer of FIG. 2.

Referring to FIGS. 2 and 3, dialer 11 includes a microcontroller 28 for controlling the components of dialer 11, communication ports 12, 14 connected to the PSTN and telephone handset 4 and dialer circuitry 90 for transmitting information to telephone handset 4 or across PSTN. Dialer 11 further includes detection or line monitoring circuitry 80 for monitoring telephone line 9, via communication ports 12, 14. In particular, line monitoring circuitry 80 detects occurrences of particular events such as an on-hook/off-hook, dial tone, ring tone, central office requests (i.e., an announcement or prompt tone requesting information), caller entered telephone number and so forth.

Dialer 11 may further include a CPU port 42 for interconnection to CPU 50 to allow CPU 50 to control the various components and circuitry of dialer 11, via microcontroller 28. CPU port 42 is optional, as programming can take place either via telephone handset 4 or via DTMF tones over the communication line. In the case where apparatus 10 is computer controlled, CPU port may be a serial port, parallel port, USB, Optical Cable Interface (OCI) bus, Infra red (IR) interface, Radio Frequency (RF) interface, . . . etc., such as a PC COM RS232, for interconnection to a CPU of a computer to allow computer control thereof.

Turning to a more detailed description of dialer 11, first communication port 12 and second communication port 14 are respectively connected to PSTN 2 and telephone handset 4. First communication port 12 may be connected to a telephone network (PSTN), or a PBX or Centrex. Second communication port 18 is connected to telephone handset 4. Apparatus 10 can, thus, monitor the communication pathway between telephone handset 4 and PSTN 2, and transmit and receive information to and from telephone handset 4 and PSTN 2.

Referring again to FIGS. 2 and 3, line monitoring circuitry 80 generally refers to components of dialer 11 associated with the monitoring of telephone handset 4 and PSTN 2 for signals corresponding to particular events or occurrences, such as a on-hook/off-hook operations, dial-tone, ring-tone, request from a central office for information (i.e., a prompt tone or an announcement). Line monitoring circuitry 80 can include a ring detector 20 for detecting a ring tone signal received from PSTN 2, a subscriber Line Interface Circuit (SLIC) 22 and an Analog-to-Digital (A/D) converter 36 for converting analog signals to digital signals which can be recognized and processed by microcontroller 28. SLIC 22 in combination with Audio Amp 38, Central Office Interface Circuit (COIC) 26 and DTMF detector 40 monitor and detect signals corresponding to requests from central office 8 for information (in the form of announcements or prompt tones). Hookup detector 24 monitors and detects signals corresponding to off-looking hook operations at telephone handset 4, and an audio amp 38, connected between SLIC 22 and COIC amplifies signals received from PSTN 2.

Dialer circuitry 90 refers generally to components of dialer 11 associated with the transmission of data such as the calling card number and the telephone number to the PSTN or a dial-tone to telephone handset 4. Dialer circuitry 90 generally includes DTMF generator 34 connected to and controlled by microcontroller 28 for generating telephone tone frequencies. To communicate information across PSTN 2, CPU 50 (via microcontroller 28) causes DTMF generator 34 to generate telephone tones at varying frequencies or signals representative of the data or information to be transmitted, such as access data, telephone number, and calling card number. The generated tones pass through SLIC 22 and are transmitted across PSTN 2, via first communication port 12.

Dialer circuitry may also be utilized to generate and transmit a dial-tone (i.e., a dial-tone emulator) to telephone handset 4, via DTMF generator 34, SLIC 22, audio amp 38, COIC 26 and communication port 14.

Depending on the particular embodiment of the present invention, dialer 11 may also include a first switch 16 and/or a second switch 18 (FIGS. 3, 4, 5 and 6). Switch 16 may be positioned to connect telephone handset 4 directly to PSTN 2 in the "A" position, or to connect line monitoring circuitry 80 and dialer circuitry 90 to PSTN 2 in the "B" position. That is to say, switch 16 is positioned in the "B" position to form a communication pathway between line monitoring circuitry 80 and dialer circuitry 90 and PSTN 2, in order to allow apparatus 10 to communicate with central office 8. Switch 16 is employed in the "A" position to form a direct communication pathway between telephone handset 4 and PSTN 2, i.e., for non-calling card telephone calls or after completion of a calling card transaction with central office 8. Switch 16 can be controlled by CPU 50, via microcontroller 28.

Second switch 18 may be positioned to connect telephone handset 4 to line monitoring circuitry 80 and dialer circuitry 90 in the "B" position, and to disconnect circuitry 80, 90 from telephone handset 4 in the "A" position. That is to say, when switch 18 is in position "B", apparatus 10 can monitor the activities at telephone handset 4, such as an on-hook or off-hook operation, entry of a telephone number and so forth, as well as transmit signals to telephone handset 4, such as a dial-tone. As with switch 16, CPU 50 can control switch 18, via microcontroller 28.

It is important to understand that, in the case of a computer integrated apparatus 10 (i.e., PC embedded), dialer 11 may take the form of a modem, such as a Voice modem or soft modem, which has all the above-described capabilities of the dialer. A soft modem as used herein generally refers to a CPU function of a computer, in which the telephone and PSTN interface circuits are part of the motherboard. In any event, such communication devices are equipped with a sophisticated digital signal processor (DSP) capable of detecting and generating tones, detecting voice, detecting and performing off-on/hook operations, and connecting and disconnecting the line via a CPU controlled switch. Such modems can be modified to perform the same functions and operations of dialer 11, as described above.

Figure 4:
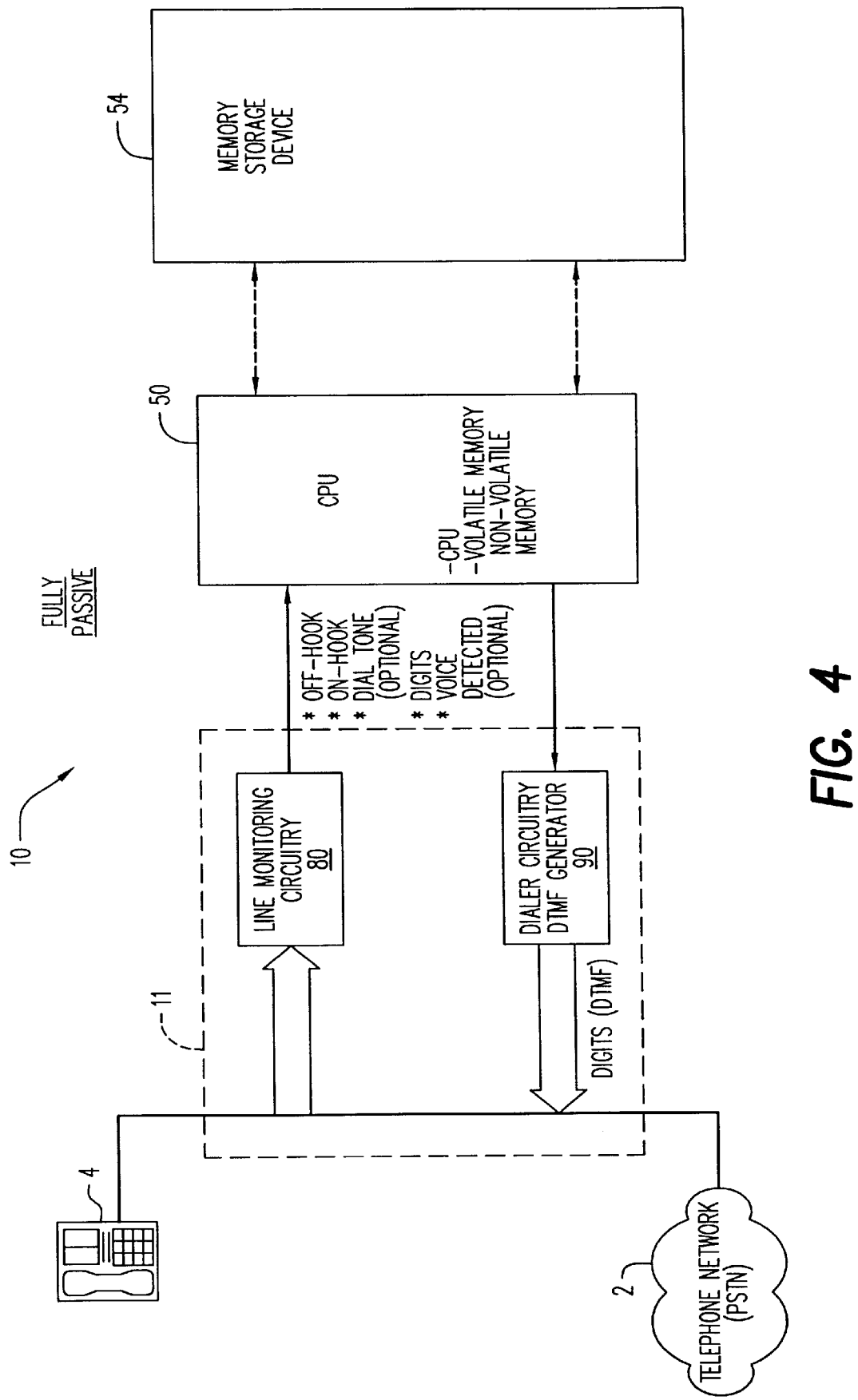
FIG. 4 illustrates a first embodiment of the apparatus of FIG. 1.

FIG. 4 illustrates a first embodiment of the present invention. In the first embodiment, apparatus 10 is set to function in a FULLY PASSIVE MODE meaning that the caller is required to perform additional operations in the making of a calling card telephone call, such as reinitializing the telephone line to allow apparatus 10 to transmit signals across the PSTN. For instance, the caller is required to perform an on-hook/off-hook operation after entering a telephone number on handset 4. In this mode of operation, the additional on-hook/off-hook operation is necessary, as apparatus 10 does not utilize switches 16, 18 (as shown in FIG. 3). Instead, communication port 12, 14 are interconnected as well as connected to ring detector 20, SLIC 22 and hookup detector 24.

Referring to FIGS. 2, 3, 4 and 7, an example of making a calling card telephone call, in accordance with the first embodiment ("Fully Passive Mode") is provided below. Initially, a caller starts a calling card telephone call by off-hooking telephone 4 to obtain a dial tone (Step 100). CPU 50 detects the off-hook (i.e., detects a dial tone) and prepares to receive a telephone number from the caller. As the telephone number is entered on a user interface (i.e., a keypad) of telephone 4, CPU 50 detects the entered telephone number (i.e., each entered digit), via line monitoring circuitry 80. CPU 50 then captures and stores the entered telephone number either locally in memory storage device 52 or, if dialer 11 is being used in combination with a computer, in the computer RAM memory.

In the case that the telephone call is being made through a PBX or Centrex, the caller may add a PBX or Centrex access code such as a "9" to the beginning of the telephone number. In the alternative, apparatus 10 can be configured in such a scenario to transmit the PBX or Centric access code to the PBX or Centrex in order to obtain an outside line to the PSTN.

After receipt of the telephone number, CPU 50 monitors telephone line 9 for an on-hook operation (STEP 106). If the on-hook is not detected within a predetermined time period (i.e., the caller is making a non-calling card or ordinary telephone call), apparatus 10 does nothing and allows the entered telephone call to be transmitted across the PSTN (STEP 108). Otherwise, CPU 50, then, monitors telephone line 9 for a second off-hook represented by a off-hook detection followed by a dial-tone (STEP 110). If a dial-tone is not detected within a predetermined time period (such as in the case of an incoming ring) from the on-hook operation, the process is terminated (STEP 114). It is preferred that the predetermined time period from the on-hook operation is approximately on second. Also, the on-hook/off-hook operation may be represented via the "FLASH" operation available on many telephone handsets. This "FLASH" operation typically represents an on-hook/off-hook operation of approximately 600 milli-seconds.

It should be noted that the on-hook/off-hook operation, as described above, provides the function of notifying apparatus 10 of the caller intent to make a calling card telephone call. Such an operation further causes the transmission of an on-hook/off-hook signal to PSTN 2 to prepare the PSTN to receive data, such as a telephone number, from apparatus 10 (and telephone handset 4). That is to say, the on-hook/off-hook signal transmitted to the PSTN results in the reinitialization of the communication pathway between apparatus 10 (and telephone handset 4) and PSTN 2.

Thereafter, if a dial tone is detected, CPU 50 retrieves access data (i.e., "0" or "1-800" number) associated with the calling card from calling card database 56 and causes dialer circuitry 90 to generate telephone tone frequencies, representative of the access data. The telephone tone frequencies are transmitted across PSTN 2 to initiate communication with central office 8 which controls the calling card transaction (STEP 116). Dialer 11 monitors telephone line 9 for a response by the central office requesting information, such as a prompt tone (i.e., special tone frequency) or voice announcement (STEP 118). Upon such a response, dialer 11 transmits the requested information according to the particular transactional protocol (stored in transactional database 54) utilized by the central office, i.e., in the order requested by the central office (STEP 120).

It should be noted that, for each calling card stored in calling card database 56, the transactional protocol or sequence in which the central office requests information is stored in transactional database 58. Apparatus 10 can thus identify the particular information requested by the sequence of the request and, accordingly, transmit the appropriate information thereto.

For instance, in the case of a SNET Card (FIG. 10), CPU 50 utilizes Second Protocol 62 (FIG. 12) to perform the calling card transaction with central office 8. Upon the detection of a first request from central office 8, such as "Please enter the telephone number", CPU 50 retrieves and transmits the entered telephone number to central office 8. Upon the detection of a second request from central office 8, such as "Please enter your calling card number", CPU 50 retrieves and transmits the calling card number to central office 8. It is important to note that CPU 50 takes into account various timing considerations such as the announcement duration, the period for response and so forth, when transmitting the requested information to central office 8. Accordingly, CPU may be configured to transmit information to central office 8 after the expiration of a predetermined time period.

After all the information requested is transmitted to central office 8, the central office initiates a communication connection between telephone handset 4 and the receiving party, associated with the entered telephone number. Upon a connection with the receiving party (i.e., the receiving party picking up or off-hooking), the calling card telephone call is completed, and the telephone call will be charged to the caller account corresponding to the card number.

Figure 5:
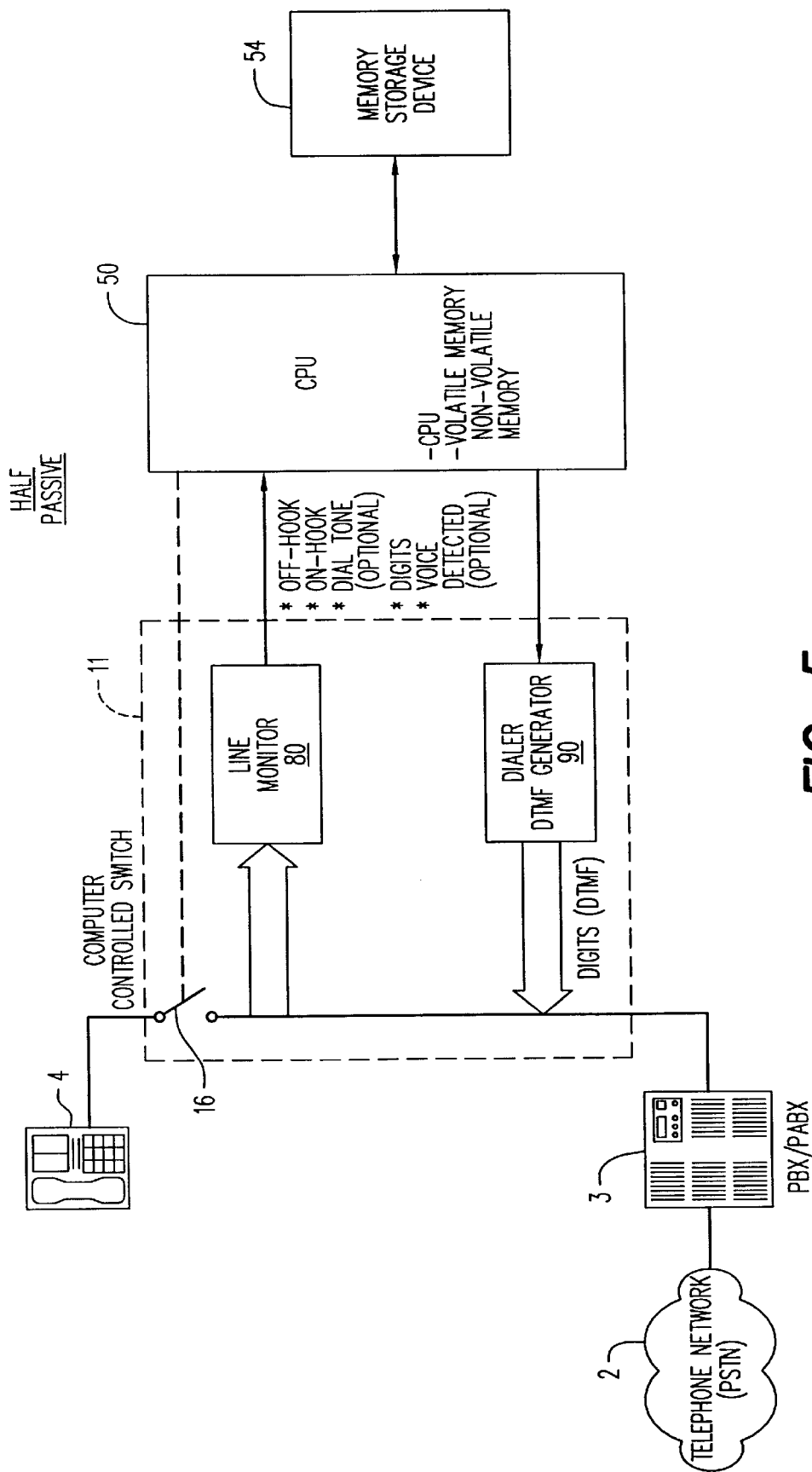
FIG. 5 illustrates a second embodiment of the apparatus of FIG. 1.

FIG. 5 illustrates a second embodiment ("Half-Passive Mode") of apparatus 10 which includes CPU 50, line monitoring circuitry 80, dialer circuitry 90 and memory storage device 54. However, unlike the first embodiment as described above, the second embodiment includes or employs switch 16 of dialer 11 (FIG. 3) to perform automatically the telephone line re-initialization procedure, i.e., on-hook/off-hook operation. As a result, unlike the first embodiment, a caller is only required to enter a desired telephone number and is not required to reinitialize the telephone line (i.e., on-hook/off-hook). In this way, a caller can make a calling card telephone call by entering a telephone number on handset 4.

Figure 8:
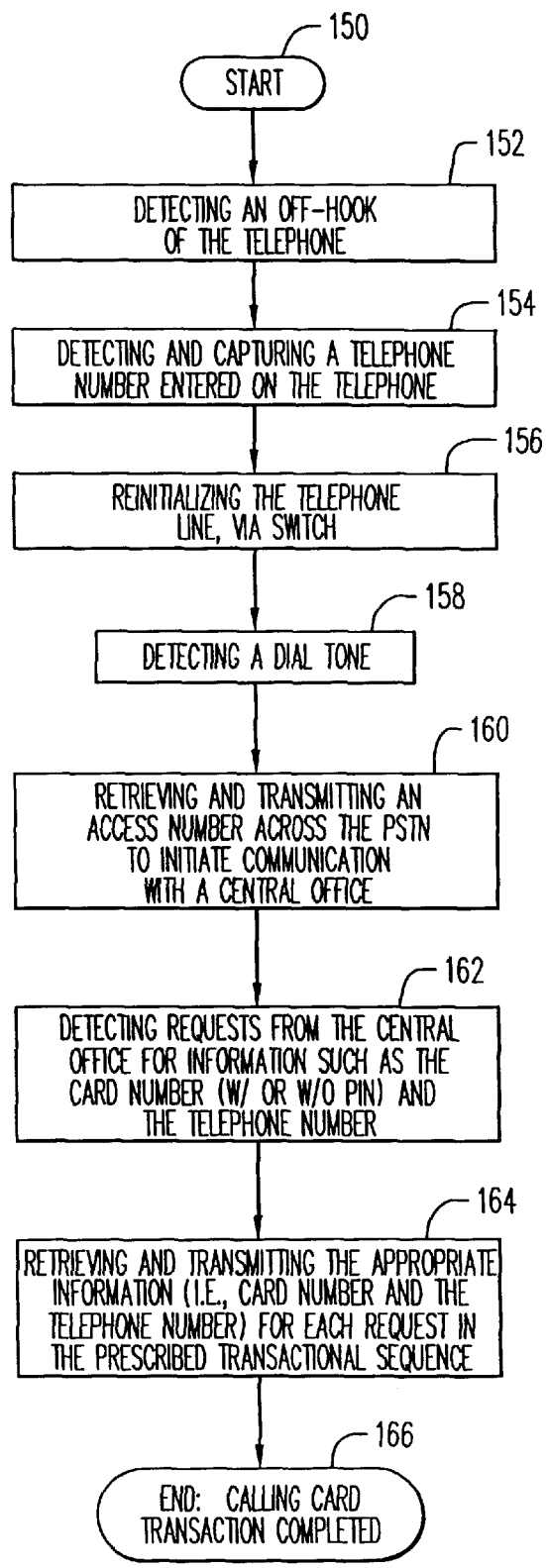
FIG. 8 illustrates a logic flow diagram of the second embodiment of FIG. 5.

An operational example of the second embodiment of dialer 11 is provided below, as shown in the logic flow diagram of FIG. 8. Initially, a caller starts the process by off-hooking the telephone handset 4 to make a call (Step 150). Apparatus 10 monitors and detects the off-hook operation at telephone handset 4 and prepares to receive a telephone number entered on telephone handset 4 (Step 152). As a telephone number is entered on telephone handset 4, apparatus 10 detects the entered telephone number (via dialer 11) and stores the entered telephone number in memory storage device 54 (Step 154). Note that apparatus 10 may be configured to abort the transaction if the dialed number is less than seven digits, such as 911 and 411 calls. Apparatus 10 may also be configured to abort the transaction for calls which are not to be billed to the calling card such as 1-800 or 1-900 calls.

Thereafter, apparatus 10 reinitializes telephone handset 4, via switch 16, to allow transmission of data across the PSTN, via telephone line 9 (Step 156). For instance, CPU 50 opens switch 16 for one second, i.e., to position "B" (on-hook emulation) and then closes switch 16, i.e., position "A" (off-hook emulation). Upon a detection of a dial tone (Step 158), apparatus 10 retrieves and transmits access data, across the PSTN, to initiate communication with a central office 8 which controls the calling card transaction (Step 160). Upon a connection with central office 8, apparatus 10 monitors and detects each request from central office 8 for information, such as the card number and the telephone number (Step 162). For each request, apparatus 10 retrieves the information requested from memory storage device 54 and transmits the information (via dialer 11) in the transactional protocol or sequence prescribed by the central office (Step 164). As described in the first embodiment, apparatus 10 transmits information according to the protocol stored in transactional database 58.

After all the information requested is transmitted to central office 8, the central office initiates a communication connection between telephone handset 4 and the receiving party associated with the entered telephone number. Upon a connection with the receiving party (i.e., the receiving party picking up or off-hooking), the calling card telephone call is completed. Accordingly, the telephone call will be charged to the caller account corresponding to the card number.

Although the above operation describes an automatic operation of apparatus 10, apparatus 10 may also be configured to initiate a calling card transaction only in response to a caller intent to make a calling card telephone call. Such an intent may take the form of a predetermined caller input, i.e., the entry of "#" or "*". In this scenario, apparatus 10 performs the automated operations as described above, in response to the detection of a caller intent to make a calling card telephone call.

Figure 6:
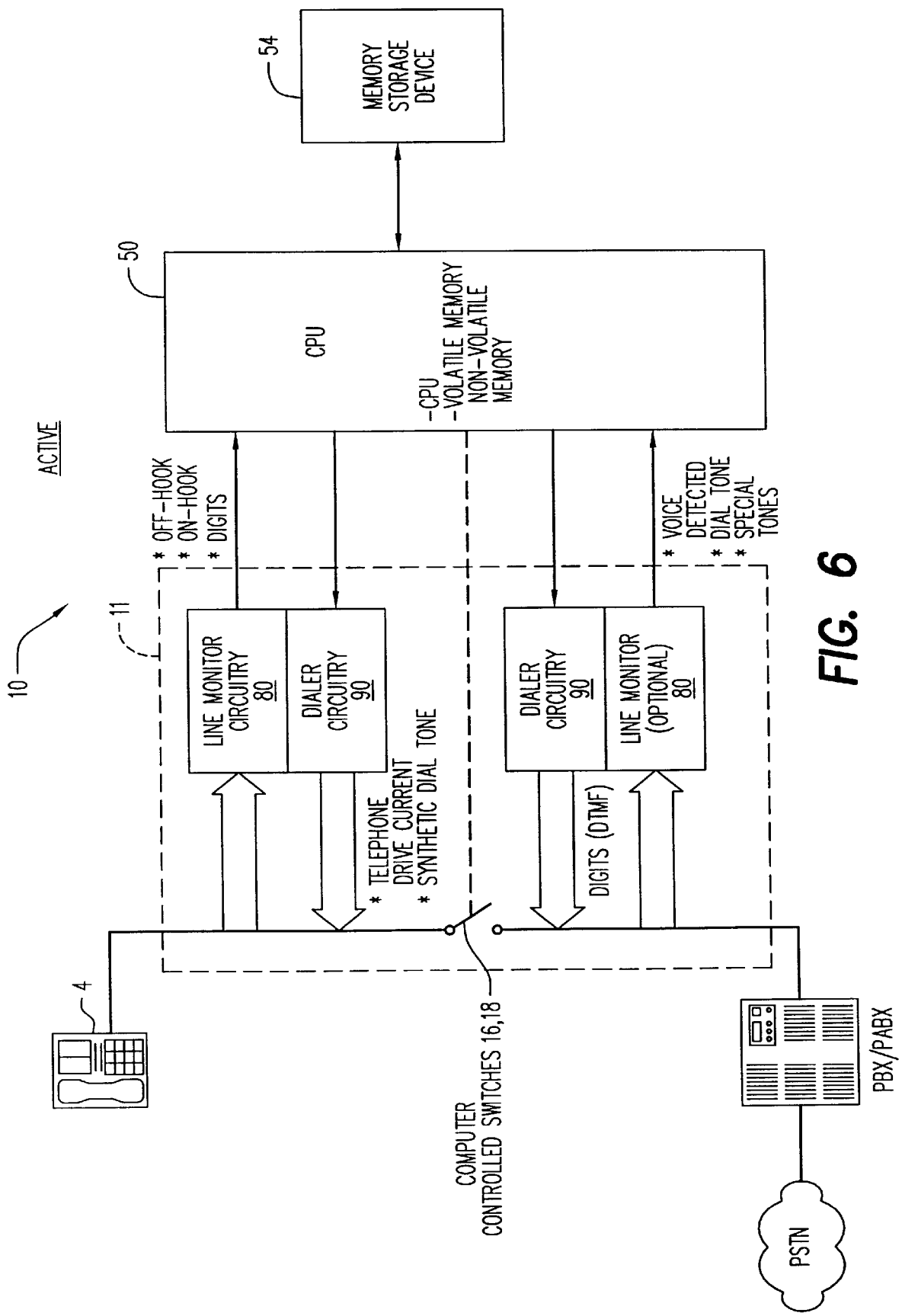
FIG. 6 illustrates a third embodiment of the apparatus of FIG. 1.
Figure 7:
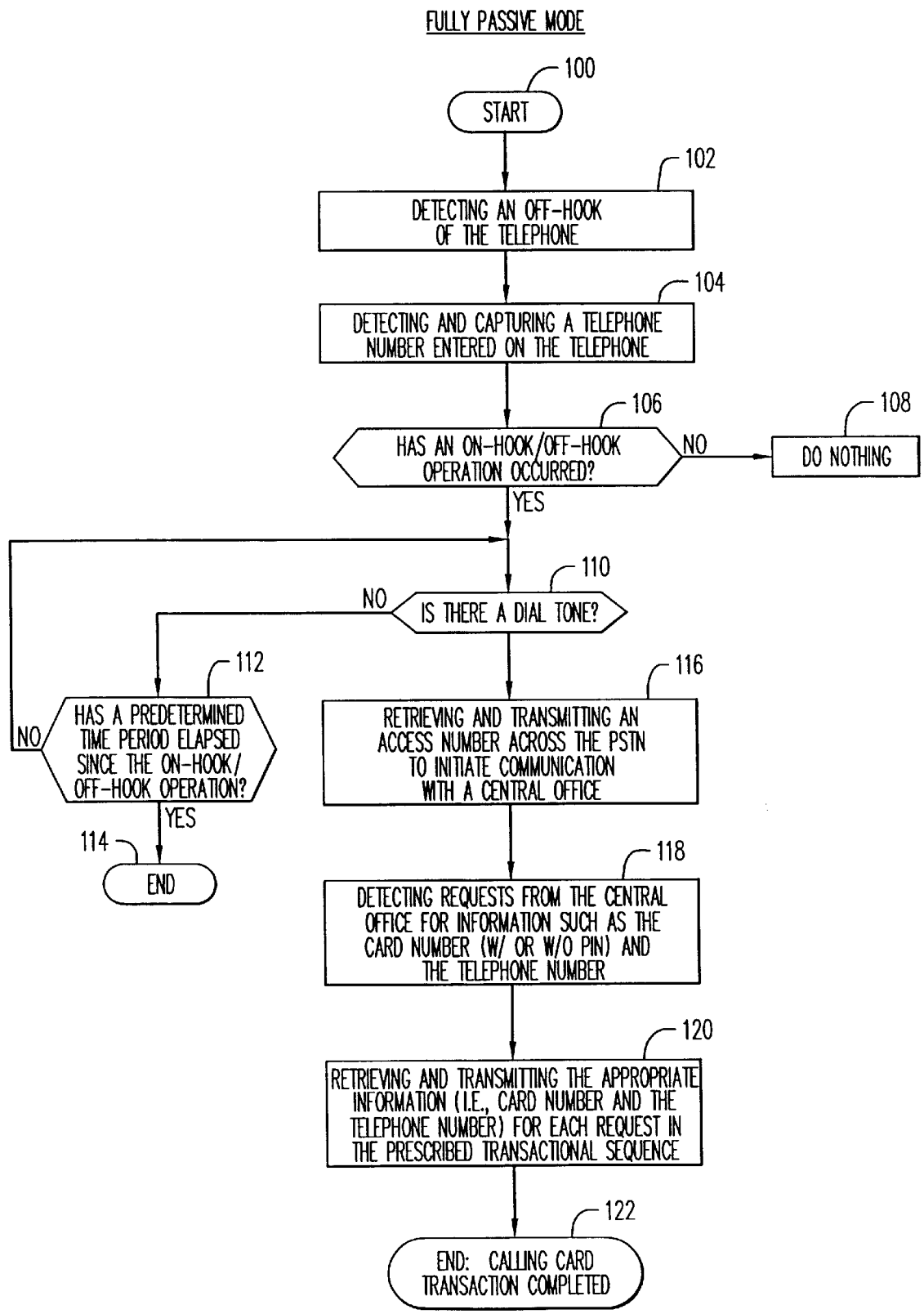
FIG. 7 illustrates a logic flow diagram of the first embodiment of FIG. 4.

FIG. 6 illustrates a third embodiment of the present invention ("Fully Automatic Mode") which includes CPU 50, line monitoring circuitry 80, dialer circuitry 90 and memory storage device 54. Unlike the first and second embodiments, apparatus 10 includes and employs both switches 16, 18 to obviate the need to reinitialize telephone line 9 (i.e., on-hook/off-hook operation). Switches 16, 18, as described above, can be positioned to connect telephone handset 4 directly to PSTN 2 or the line monitoring and dialer circuitry of dialer 11, or to connect PSTN 2 directly to the line monitoring and dialing circuitry of dialer 11.

Figure 9:
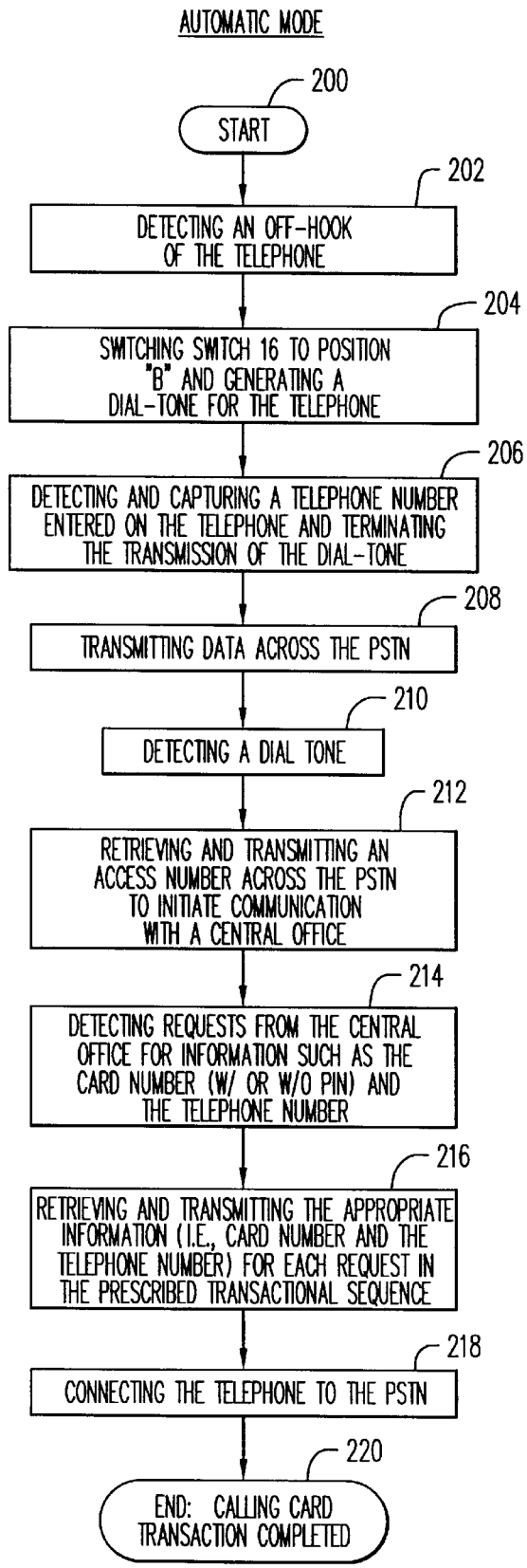
FIG. 9 illustrates a logic flow diagram of the third embodiment of FIG. 6.

An operational example of the third embodiment of the present invention is provided below, as described in the flow diagram of FIG. 9. Initially, apparatus 10 has switch 16 in the "A" position and switch 18 in the "B" position. A caller starts the process by off-hooking the telephone handset 4 to make a call (Step 200). Apparatus 10 monitors and detects an off-hook signal corresponding to the off-hook operation at telephone handset 4. Apparatus 10 then positions switch 16 to position "B", and generates and transmits a dial-tone to telephone handset 4 to provide the caller with the illusion of an outside line (Step 204). As the caller enters the first digit of a telephone number, apparatus 10 detects the first digit and terminates the transmission of the dial-tone. Apparatus 10 further stores the entered telephone number, i.e., each digit of the telephone number, in memory storage device 54 (Step 206). Apparatus 10 may be configured to abort the transaction if the dialed number is less than seven digits, as described in the second embodiment of the present invention. For instance, apparatus 10 may abort the transaction for dialed numbers such as 411, 911 or 1-800 numbers.

Thereafter, apparatus 10 (via port 12) detects for a real dial-tone from PSTN 2 (Step 210) and, in response thereto, retrieves access data corresponding to the calling card to be used. Apparatus 10 transmits the access data, across the PSTN, to initiate communication with a central office 8 in charge of the calling card transaction (Step 212). Upon a connection with central office 8, apparatus 10 monitors and detects each request from central office 8 for information, such as a request for the card number and the telephone number (Step 214). For each request, apparatus 10 retrieves the information requested from memory storage device 54 and transmits the requested information, via dialer 11, in the transactional protocol or sequence prescribed by the central office (Step 216). As described in the first and second embodiment, apparatus 10 transmits information according to the protocol stored in transactional database 58.

After all the information requested is transmitted to central office 8, the central office initiates a communication connection between telephone handset 4 and the receiving party associated with the entered telephone number. Apparatus 10 detects a legitimate tone, such as a ring-tone or a busy-tone, which indicates that the calling card transaction has been completed. Apparatus 10 then causes switch 18 to be positioned in position "B" and switch 16 to be positioned in position "A", thereby connecting telephone handset 4 to PSTN 2 (Step 218). It should be noted that apparatus 10 may also perform the above switching operation after a predetermined time period has elapsed (i.e., exceeding a time-out period). Upon a connection with the receiving party (i.e., the receiving party picking up), the calling card telephone call is completed and the telephone call will be charged to the caller account corresponding to the card number.

Figure 13:
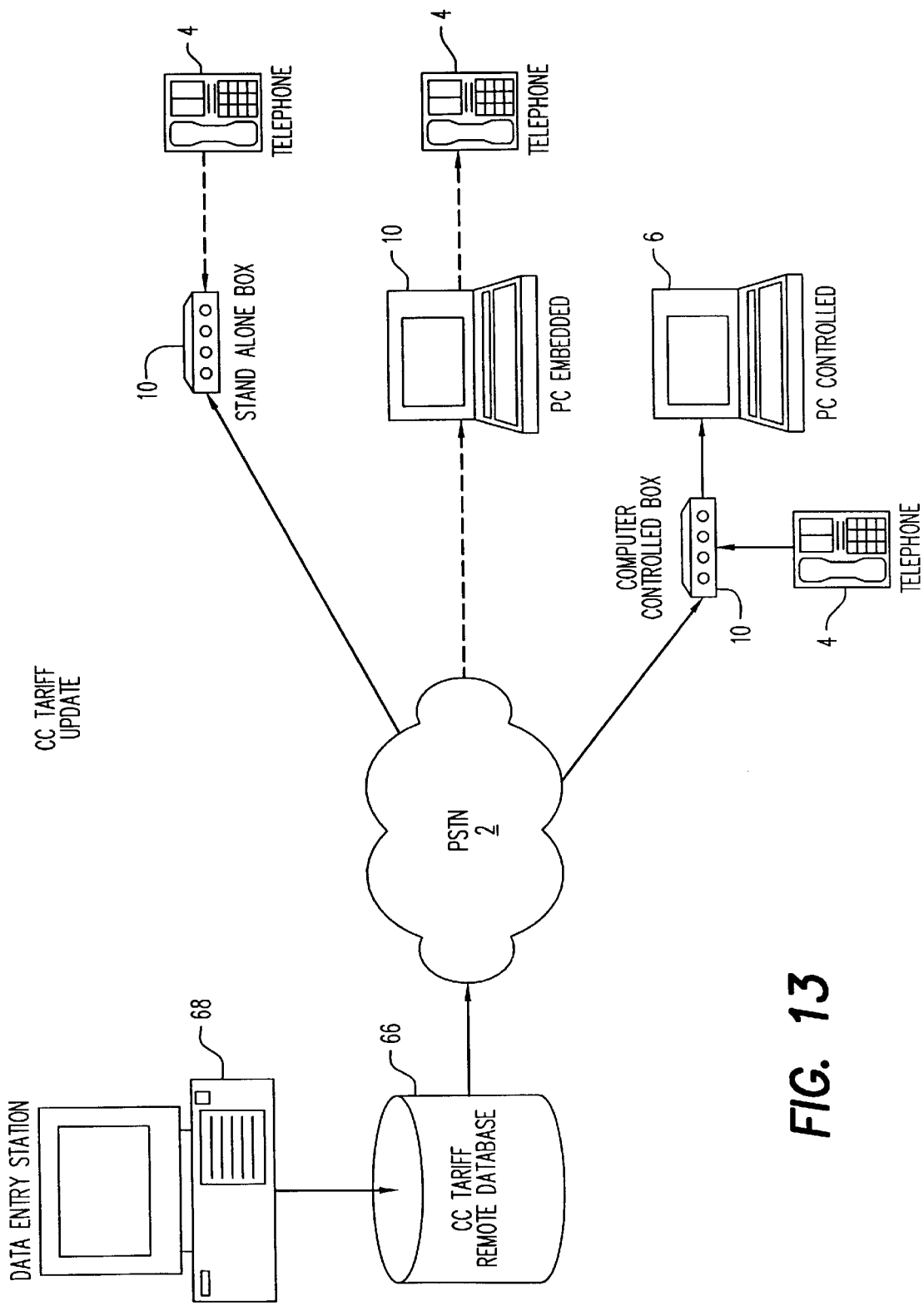
FIG. 13 illustrates a fourth embodiment of the apparatus of FIG. 1 which selects an appropriate calling card to be used based on various conditions.

Referring to FIG. 13, a fourth embodiment of the invention provides an apparatus 10 capable of selecting an optimum calling card to be used from a plurality calling cards stored in apparatus 10. As shown in FIG. 13, PSTN 2 has connected thereto an additional data storage device 66 accessible by apparatus 10. The data stored in data storage device 66 includes selection information necessary to make a determination of the optimum calling card to use. The selection information is preferably continuously updated, via a data entry station 68, to reflect current conditions. For each of the above embodiments, apparatus 10 can be configured to access data storage device 66 anytime on a periodic basis or per demand by the device (i.e., a general update of the rate information for the plurality of calling cards) or after storing an entered telephone number. Accordingly, apparatus 10 can analyze the selection data and select an optimum calling card for use, when making a calling card telephone call.

Data storage device 66 may include various information to aid in the selection of an optimum calling card. For instance, apparatus 10 may download selection information from data storage device 66 to select an optimum calling card, based on the basic tariff for calling cards having all the same parameters. In this case, the selection information may include the following types of information: the call category (i.e., intrastate; interstate; overseas country; a particular country, . . . etc.); minimal period; additional period; surcharge; rounding method; various discounts (i.e., committed volume or term; preferred destination; . . . etc.); affinity group discounts; data and time of day dependencies; and any additional information manually entered by the caller to reflect changes such as the calling card becoming unavailable (i.e., exceeding credit limit).

Apparatus 10 may also select the optimum calling card according to predicted costs, typically in cases where the calling cards have differing parameters. In this case, the selection data necessary to predict the cost of the telephone call may include the above-mentioned factors (i.e., call category, basic rate, . . . etc.) and, in addition thereto, predicted call duration information, based on publicly available information, caller supplied information and/or data retrieved from a calling card log file.

While the selection information is described above as being downloaded from data storage device 66 (via the PSTN), such information may also be downloaded by other methods including but not limited to a modem (via a file transfer protocol (FTP)), DTMF signaling, a portable memory medium (i.e., diskette), . . . etc.

The invention having thus been described with particular reference to the preferred forms thereof, it will be obvious that various changes and modifications may be made therein without departing from the spirit and scope of the invention as defined in the appended claims.

I claim:

1. An apparatus for facilitating the making of a calling card telephone call from a user interface connectable to a telephone network, said apparatus comprising:
   memory means for storing access data to enable access to a central telephone office connected to said telephone network, user account data, and a telephone number;
   means for transmitting and receiving signals to and from said user interface, said telephone network and said central telephone office; and
   processing means:
     (i) responsive to a receipt of said telephone number from said user interface, for storing said telephone number in said memory means,
     (ii) for causing said means for transmitting to transmit said access data from said memory means, across said telephone network, to initiate communication with said central telephone office, and
     (iii) responsive to requests for information from said central telephone office, for causing said means for transmitting to transmit said telephone number and said account data in the order requested by said central telephone office, to complete a calling card transaction.

2. The apparatus as recited in claim 1, wherein said processing means causes said means for transmitting to transmit said access data, in response to receipt of a user intent signal to make a calling card call.

3. The apparatus as recited in claim 2, wherein said user intent signal comprises an on-hook signal followed by an off-hook signal of said user interface, after said entry of said telephone number.

4. The apparatus as recited in claim 3, wherein said off-hook operation occurs in a predetermined period after said on-hook operation.

5. The apparatus as recited in claim 2, wherein said user intent signal comprises an entry of a predetermined character on said user interface, after said entry of said telephone number.

6. The apparatus as recited in claim 1, further comprising first switch means, coupled between said telephone network and said user interface for causing an on-hook signal or an off-hook signal to be transmitted to said telephone network.

7. The apparatus as recited in claim 6, wherein said processing means, in response to a receipt of said telephone number, causes said first switch means to reinitialize said telephone network to receive a new signal.

8. The apparatus as recited in claim 6, further comprising a second switch means, coupled between said user interface and said first switch means, for connecting and disconnecting said user interface from said telephone network.

9. The apparatus as recited in claim 8, wherein said processing means, responsive to a first off-hook signal from said user interface, causes said second switch means to disconnect said user interface from said telephone network, to prevent transmission of said telephone number from said user interface, across said telephone network.

10. The apparatus as recited in claim 9, wherein said processing means, responsive to a first off-hook signal from said user interface, causes said means for transmitting and receiving to transmit a dial-tone to said user interface.

11. The apparatus as recited in claim 10, wherein said processing means, responsive to a receipt of a first digit of said telephone number from said user interface, causes said means for transmitting and receiving to terminate transmission of said dial-tone to said user interface.

12. The apparatus as recited in claim 1, wherein said means for transmitting and receiving includes means for generating telephone tone frequencies.

13. The apparatus as recited in claim 1, wherein said means for transmitting and receiving includes means for generating a dial-tone.

14. The apparatus as recited in claim 1, wherein said means for transmitting and receiving includes means for detecting a request for information from said central telephone office.

15. The apparatus as recited in claim 14, wherein said request for information comprises a voice announcement.

16. The apparatus as recited in claim 14, wherein said request for information comprises a predetermined tone frequency.

17. The apparatus as recited in claim 14, wherein said request for information comprises an expiration of a predetermined period.

18. The apparatus as recited in claim 1, further comprising means for selecting an optimum calling card from calling cards stored in said memory means, based on current conditions including at least current card rates for each of said calling cards.

19. The apparatus as recited in claim 18, wherein said means for selecting includes means for downloading data corresponding to said current conditions from a central database.

20. The apparatus as recited in claim 1, further comprising means for selecting an optimum calling card from calling cards stored in said memory means, based on current predicted telephone call cost conditions.

21. The apparatus as recited in claim 20, wherein said means for selecting includes means for downloading data corresponding to said current conditions from a central database connected to said PSTN.

22. A method for facilitating the making of a calling card telephone call from a user interface across a telephone network, comprising the steps of:

(a) detecting and storing a telephone number entered on said user interface;

(b) transmitting access data, associated with a central office, across said telephone network to initiate communication with said central office without first establishing an association that relates said calling card to said user interface; and (c) detecting information requests for at least account data and said telephone number from said central office and, in the order requested, transmitting the requested information to said central office, to enable said central office to then establish said association between said calling card and said user interface and complete said calling card telephone call.

23. The method as recited in claim 22, wherein step (a) further includes the step of detecting a user intent signal to make a calling card telephone call.

24. The method as recited in claim 23, wherein the step (b) transmits access data, in response to receipt of said user intent signal.

25. The method as recited in claim 22, wherein step (b) includes the step of transmitting an on-hook/off-hook signal to said telephone network, prior to transmitting said access data.

26. The method as recited in claim 25, further comprising the step (d), prior to step (a), of detecting a first off-hook signal corresponding to a first off-hook operation at said user interface and, responsive to said first off-hook signal, for transmitting a dial-tone to said user interface.

27. The method as recited in claim 26, wherein step (a) terminates transmission of said dial-tone, upon detection of a first digit of said telephone number entered on said user interface.

28. The method as recited in claim 22, further including step (e), prior to step (b), of transmitting an on-hook signal followed by an off-hook signal to said telephone network.

* * * * *